Patented Oct. 6, 1936

2,056,461

UNITED STATES PATENT OFFICE 2,056,461

MANUFACTURE OF MOLDED ARTICLES FROM UREA AND FORMALDEHYDE

Arthur M. Howald, Toledo, Ohio, assignor, by mesne assignments, to Plaskon Company, Incorporated, a corporation of Delaware No Drawing. Application September 14, 1934, Serial No. 744,009. In Canada September 13, 1929

5 Claims. (Cl. 106—22)

This invention relates to the manufacture of molded articles from urea and formaldehyde; and it comprises improved methods of making such articles by hot pressing procedures, wherein the hardening of the shaped composition in the mold is accelerated by acidity developed during the application of heat and pressure, the acidity being masked and inert prior to that time; and it also comprises improved molding compositions comprising in commixture with fusible urea-formaldehyde reaction products, a relatively non-volatile high melting plasticizer solid at the ordinary temperature and containing an acid in solid solution, whereby its acidity is masked and ineffective until the heat in molding fluxes the plasticizer and the urea-formaldehyde reaction products together; all as more fully hereinafter set forth and as claimed.

In making molded articles by hot pressing thermo-plastic heat-hardening compositions, the requirement for production of commercially satisfactory articles are exacting. For one thing, the heating has two opposing functions, namely, to soften the composition to a fluent state so that it can be flowed and shaped by the pressure and to rapidly harden the composition after shaping. In other words, the heat must first make the composition fluent and then make it rigid. The actions must be successive, only a limited amount of over-lapping being permissible. To a certain extent, the speed of the resinifying operation with formaldehyde-urea plastics, that is, the development of rigidity, depends on the acidity at the time; the greater the acidity, the quicker hardening takes place. Too much acidity in the composition at the time of flow, cuts short the flow.

Not all urea-formaldehyde reaction products are suitable for hot molding, but some have been devised which can be so used. Fusibility and complete dryness are prerequisites. In certain copending applications, to wit, Ser. No. 280,949, filed May 26, 1928; Ser. No. 339,225, filed Feb. 11, 1929; Ser. No. 363,412, filed May 15, 1929; Ser. No. 459,822, filed June 7, 1930 (now Pat. 1,910,-338); Ser. No. 466,044, filed July 7, 1930 (now Pat. 1,928,492); Ser. No. 481,807, filed Sept. 13, 1930; Ser. No. 484,718, filed Sept. 26, 1930 (now Pat. 1,928,493); Ser. No. 484,719, filed Sept. 26, 1930; Ser. No. 494,693, filed Nov. 10, 1930; Ser. No. 578,744, filed Dec. 3, 1931; Ser. No. 495,230, filed Feb. 25, 1932; Ser. No. 597,425, filed Mar. 7, 1932; Ser. No. 621,758, filed July 9, 1932; Ser. No. 720,912, filed Apr. 16, 1934. I disclose various methods of making urea reaction products satisfactory in hot molding; convertible into rigid insoluble, infusible molded articles when hot pressed. The methods disclosed in Ser. No. 494,693 are typical and the procedure hereinafter set forth in Example 1 is illustrative of such methods. All these compositions are slightly acid, the acidity being of the order of 5 to 6 pH; and in the hot mold they first flow and then set. Sufficient time is afforded for good flow.

The urea-formaldehyde products obtainable by the methods of the said applications are useful here as a base composition for the manufacture of the present improved molding powders; powders containing an additional component or ingredient by which their flow and hardening in the mold are improved. The improved molding compositions and their manufacture here claimed, are hereafter described in detail.

I have found that without making the consecutive reactions overlap I can accelerate the hardening step, the production of rigidity by having in the composition what I may call a masked acid; an acid which does not become effective until softening and flow occur. To this end I add to the mixture a fusible inert material acting as a flux and plasticizer to aid in flow; and in this plasticizer in solid solution I have an acid material. By this expedient after fluxing and flow have gone forward the acidity of the system is suddenly considerably increased. By so doing, I make a quicker hardening operation without interfering with the flowing operation; the articles require less time in the mold or, conversely, for an equal time a greater rigidity and hardness are attained. Better articles are made.

By having the acid substance in solid solution in a solid plasticizer, no acid effect is exercised at any time or at any temperature prior to the molding. This is important, since with these urea formaldehyde condensation products any substantial acidity will cause hardening, even at low temperatures. Time and temperature are, to a certain extent, reciprocal. Direct addition of an acid substance to a dry molding powder is inexpedient. The acid acts during flow when its functions are not wanted. With a masked acid solution in a solid plasticizer, all acid action is postponed until after some flow has occurred and is not then wholly instantaneous.

A relatively small amount of acid is sufficient to properly accelerate hardening. When the acid itself is directly added to a molding powder it is difficult to uniformly disperse the small amount of acid throughout the powder. Uniformity is essential in these molding compositions. By first preparing a solid solution of the acid in a solid plasticizer and then mixing this solid solution with the urea-formaldehyde condensation product a better and more uniform distribution of the acid is obtained. The plasticizer, in a sense, extends or dilutes the acid, so that it is more uniformly incorporated during the mixing operation.

The presence of a masked acid in the molding powder is also important as tending towards standardization. Different batches of urea-formaldehyde condensation products are apt to have slightly different acidity and behave differently in the mold; and particularly if they have been in storage for any length of time. By the presence of positively acting acid formed at the right time and temperature, conditions in setting can be better adjusted.

By the present invention uniform and consistent results are easily obtained. The improved molding powders are stable. They give the required actions in the proper order when hot pressed, the desired acidity being obtained at the proper time. The molding properties of the composition can be controlledly varied and adjusted as desired. By correlating the plasticizer and acid and the proportions thereof, compositions meeting a molder's specification of properties can be prepared. In hot pressing a body of plastic heat passes from the periphery to the center and to a certain extent the properties of the composition should be adjusted to the size and shape of the article to be made. This is possible in the present invention.

While the plasticizer is primarily used to develop a postponed acidity, it effects the softening and flow points of the molding powder as well as the properties of the final molded article. Its plasticizing functions are also important.

Plasticizers have been used in the prior art with certain urea-formaldehyde resins as well as with other plastic composition made with resin. Plasticizers mostly however, are not supposed to add hardness. They are used mostly for the opposite purpose: of controlling and lessening hardness. The presence of a plasticizer of any kind in a urea-formaldehyde molding composition is not necessary if the composition is properly made and, on the other hand, its presence is apt to delay the type of hardening wanted. But in using it as a carrier for masked acid in such a way that it can develop and postpone acidity, its advantages are great.

In the present processes any formaldehyde-urea molding composition suitable for hot pressing may be used. The molding compositions prepared by the methods of my acknowledged copending applications may be used. The compositions described in applications Serial Nos. 494,693; 595,230; 597,425; 621,758 now Patent 2,016,199; 684,606 and 712,611 are particularly advantageous. As stated, these compositions are all faintly acid and will harden under heat. Alkaline urea-formaldehyde condensation products are thermoplastic but they do not harden. By having a slightly alkaline composition and admixing it with a plasticizer adapted to develop a postponed acidity, the advantages of the alkalinity as regards free flow and of the acidity in producing quick rigidity are successively obtained. The compositions of the acknowledged applications, however, not only flow well but set and they are free of contained volatiles (water and formaldehyde). With any volatile matter in a mixture submitted to hot pressing, the pressure must be sufficient to restrain a development of vapor; for a vesiculated product is to be avoided. By having the composition free of volatiles the difficulty is avoided.

In certain of the copending applications Serial Nos. 363,412 now Patent 2,016,198; 466,044; 481,807; 484,719; 494,693 and 578,744, the addition of particular solid solutions of acid in plasticizer to the molding powder is disclosed. Those applications are primarily directed to and claim improvements in making the urea-formaldehyde reaction products and molding powders containing them. The present application is particularly directed to the improvements resulting in the use of masked acids.

This application is in part a division and a continuation of the said applications, and contains subject matter in common therewith.

In utilizing the principles of the present invention the ordinary routine of hot molding need not be changed. In ordinary hot molding operations pressures of 1000 to 8000 pounds per square inch and mold temperatures 125° C. and 165° C. are used. Consequently in preparing molding compositions they should be adjusted in properties to function within those ranges.

Urea-formaldehyde reaction products when properly prepared will soften and flow under those pressures at temperatures between 120° C. and 150° C. The presence of fillers in the molding composition alters the flow point, but filler-containing mixtures having proper flow characteristics can be easily prepared. The methods of the said copending applications give them.

In the present improved compositions flow characteristics can be adjusted between rather wide limits by adjusting the plasticizer in correlation with the other ingredients. The molding composition should flow under the stated pressures at temperatures between 130° C. and 145° C.

Any suitable solid, substantially non-volatile plasticizer of the proper fusibility may be used. The selected plasticizer should not melt or substantially soften below 90° C. otherwise acid will be prematurely liberated. To obtain molded products with high resistance to water, the plasticizer should be non-hygroscopic and be insoluble in water to a high degree. Like any other plasticizer it should be miscible with the urea-formaldehyde reaction product.

Widely different types of materials may be used as a plasticizer to contain and mask the acid. Alkyl-toluene sulfonamids, for instance, ethyl toluene sulfonamid and methyl toluene sulfonamid have certain advantages. The esters of phthalic and other aromatic acids, solid at ordinary temperatures but melting or softening at molding temperatures, can be used. The complex resinous materials obtained by esterifying phthalic anhydrid with glycerine can be used to advantage. In making such phthalic-glycerine esters, a little of the acid usually remains uncombined, that is, unesterified, and they may be directly used as solid solutions of acid in the present process.

Other synthetic resins may be likewise used. For instance, toluene sulfonamid-aldehyde resins or phenol-formaldehyde resins, can be used. The latter resin is heat-hardening. When the plasticizer is also a heat-hardening body, very hard molded articles can be obtained. Heat-hardening resins are further advantageous as their melting or softening point can be easily adjusted to give liberation of contained acid at any particular temperature.

The urea-formaldehyde reaction product and the plasticizer mostly have a mutual fluxing action each upon the other. Suitable adjustments are made to prevent acid being liberated too soon under a given pressure and temperature, as by using a plasticizer of a high softening point.

Usually between 1 and 10 parts by weight of plasticizer to 100 parts of urea-formaldehyde reaction product is used. The exact amount varies with the particular plasticizer used, the proportion of filler present and the other details in a given instance. The reaction of the molding powder as a whole, whether acid or alkaline, of course also makes a difference.

Usually the solid solution (masked acid) contains between 1 and 2 parts of acid dissolved in 100 parts of plasticizer. Sometimes as high as 5 parts acid may be used. Such solid solutions can be prepared in several ways. The plasticizer may be brought to a molten condition, the proper amount of acid added and the mixture stirred until the acid has dissolved. Then the mixture is cooled, ground to a powder and added to the urea-formaldehyde molding composition in the proper amount. The selected acid should be one soluble in the given plasticizer and non-reactive therewith. Many of the synthetic resins which are suitable as plasticizers in these processes, can be prepared by methods involving the use of acid catalysts. With such plasticizers, the acid catalyst used in their preparation may remain in the resin, upon simple cooling. Plasticizer and acid may be dissolved in a common solvent and then the solvent evaporated.

Various acids may be used. It is best to use one non-volatile solid at ordinary temperature. It is advantageous if the acid becomes liquid during hot pressing as a better fluxing and admixture is obtained.

Both aromatic and aliphatic acids can be used. Of the aromatic acids, phthalic acid, benzoic acid and salicylic acid are representative. Their anhydrids may be used. Various other di-basic and mono-basic carboxylic acids and hydroxy acids may be used in lieu of the phthalic acid, etc. Tartaric acid, an hydroxy di-basic acid and oxalic acid, another di-basic acid, may be used. Each type of acids has advantages. Commercial phthalic anhydrid is often used.

The following examples in which the parts are parts by weight illustrate practical embodiments and are illustrative.

*Example 1*

1000 parts of commercial aqueous formalin containing 37 per cent of formaldehyde by weight is adjusted to pH 6.4 by the addition of triethanolamine or other suitable base non-reactive with formaldehyde. To the partially neutralized formalin are added 510 parts of urea. The molecular ratio of actual formaldehyde to urea is 1.5:1. The mixture may be slightly warmed to 25° C. to facilitate dissolving the urea.

The solution thus obtained is maintained at 25° to 30° C. for about 10 hours to secure smooth reaction and a substantially complete combination of formaldehyde and urea into an initial reaction product. The water and other volatiles are then removed by evaporation at relatively low temperatures; at temperatures of the material not exceeding 80° C. Any suitable method may be employed.

For evaporation, usually the solution is mixed with an absorbent filler to form a moist mass offering a large drying area. The mass is dried in a current of warm air until it is substantially free of volatiles, so that it may be hot pressed without vesiculation. In this particular embodiment about 100 parts of said solution were mixed with 40 to 50 parts of sulphite paper pulp and the moist mass dried in a tunnel drier with the drying air at between 120° F. and 175° F. Approximately 2 to 3 hours is required. The dried mass usually does not contain more than 2 per cent moisture, and the contained dry composition is fusible. The mass is ground to a powder in a suitable apparatus such as a ball mill. Impact grinding is advantageous. In grinding, the temperatures must not be permitted to unduly rise.

*Example 2*

To the dried molding composition obtained in Example 1, there is added 0.1 part of a solid solution comprising 5 parts of phthalic anhydrid dissolved in 100 parts of a phenol-formaldehyde resin softening at 100° C. The mixture is ground to a fine powder. The mixture can be molded at 145° C. under 2000 pounds per square inch pressure in about 1 minute to obtain a hard shaped infusible product which is high-grade and stable.

The present invention is also useful with molding powders which are free of filler. Solid solutions of acid in plasticizer may be advantageously added to the potential resins made by the processes of my applications, Serial Nos. 597,425 and 720,912.

In some cases, it is advantageous to convert the powdered mixture first made into a granular condition by malaxating, cooling and regrinding to a standard particle size by the procedure disclosed in copending application Serial No. 595,230. In this way each granule or particle is itself a miniature molding composition containing all the ingredients.

*Example 3*

To the dried granular molding composition obtained in Example 1, there is added 0.2 part of a solid solution in granular form, this addition comprising 1 part of tartaric acid dissolved in 100 parts of formaldehyde condensation product of toluene sulfonamid. The mixture is reground to give a fine powder which can be molded at 145° C. under 4000 pounds per square inch pressure in about 2 minutes to obtain a hard shaped infusible product which is high-grade and stable.

In lieu of the tartaric acid there may be used oxalic, benzoic or salicylic acid. Other plasticizers may be substituted for the toluene sulfonamid-aldehyde resin.

In the present improved process, the acid is used in amounts sufficient to give the fluxed fused mass an acidity corresponding to between pH 3 and 5. The composite molding composition is adjusted so that the acid is liberated from the plasticizer and becomes effective at temperatures between 90° and 120° C.

As disclosed in Serial No. 363,412, phthalic acid, tartaric acid or salicylic acid may be dissolved in esters of meta-toluene-sulfonamid to form a solid solution suitable for addition to the urea-formaldehyde condensation products to obtain this new mode of action during hot-pressing.

The present application is in part a division and in part a continuation of my application Ser. No. 363,412 and is directed, per se, to the improved molding compositions containing a solid solution of acid in a solid, relatively non-volatile plasticizer, irrespective of the particular method by which the fusible, heat-setting urea-formaldehyde component thereof, is produced. In Ser. No. 363,412, I describe and claim certain improved methods for making such urea-formaldehyde reaction products suitable for hot pressing.

By the present invention, I obtain both improved molding compositions and improved hot pressing methods for converting this molding composition into high-grade shaped stable products useful for many purposes. In a general way I add to the ordinary dry formaldehyde molding composition a material which first facilitates the flow and shaping of the composition and then accelerates the hardening of the shaped mass. By introducing a single additional ingredient into the molding composition, I obtained two actions which are direct opposites. However, according to the present invention those actions are obtained in the desired order.

With solid solutions of acid in a solid plasticizer, the plasticizer fluxes the mass before the acid exerts its full effect. In other words, the mass must be fluxed under heat and pressure before the acid gains full effective contact with the urea-formaldehyde condensation product.

What I claim is:

1. As a new and improved molding composition suitable for the production of stable heat-set molded articles by hot pressing methods, a dry volatile-free molding composition comprising a substantially dry finely divided, absorbent, fibrous filler impregnated with a potential resin having formaldehyde fixedly combined with urea, and a solid solution of a solid organic acid dissolved in a solid, relatively non-volatile plasticizer, said potential resin being a dry, arrested, acid condensed, low temperature reaction product of urea and formaldehyde, having formaldehyde and urea combined in approximately the ratio of 1.5:1 and being a soluble, fusible, heat-setting body, and said dry molding composition being capable of softening and of then heat-hardening, and being capable, at temperatures around 140° C. under pressures of about 1 ton per square inch, of conversion into solid, insoluble, infusible, stable, molded articles, without liberation of substantial amounts of volatiles.

2. The improved method of hot pressing urea-formaldehyde molding compositions, which comprises applying heat and pressure to the molding composition of claim 1, the heat and pressure being sufficient to shape and then heat-harden the composition, the heat being sufficient to liberate the said solid organic acid from the said solid plasticizer when said plasticizer has become fused and blended with said potential resin by the applied heat and pressure, to accelerate the hardening subsequent to the shaping.

3. As an improvement in hot pressing urea-formaldehyde compositions, the improvement which comprises adding, prior to hot pressing, a solid solution of a solid aliphatic carboxylic acid in a fusible, heat-hardening aldehyde resin, to a substantially dry finely divided absorbent fibrous filler, uniformly impregnated with a potential resin having formaldehyde combined with urea, intimately mixing the said materials and then hot pressing the said composition, said hot pressing first flowing and shaping the composition into a uniform mass of the desired shape, then liberating the said acid to accelerate the hardening of the shaped mass and finally hardening the mass to a stable rigid form while still under pressure at the hardening temperature, said potential resin being a dry, arrested, low temperature, acid-condensed reaction product of formaldehyde and urea in approximately molecular proportions ranging between 1.05:1 and 1.55:1, said potential resin being a white, colorless, dry, non-resinous, water-soluble solid, substantially free of uncombined volatiles, softening when heated, to a plastic condition without liquefying, and being capable of heat-hardening to resinous infusible, insoluble bodies by internal rearrangement and polymerization without liberation of volatiles and without alteration in the ratio of combined formaldehyde to combined urea, the heat-hardened products being stable and having a superior resistance to water and moisture.

4. As a new and improved molding composition suitable for production of stable heat-set molded articles by molding under heat and pressure, a molding composition comprising a fusible heat-setting urea-formaldehyde condensation product and a solid, fusible, relatively non-volatile plasticizer, said plasticizer having dissolved therein a solid aliphatic carboxylic acid capable of accelerating the heat-setting of said molding composition when liberated from said plasticizer under influence of heat and pressure, said plasticizer being a fusible, heat-hardening formaldehyde condensation product of toluene sulfonamid.

5. The improved molding composition of claim 4 wherein said organic acid is tartaric acid.

ARTHUR M. HOWALD.